(12) United States Patent
Hansson

(10) Patent No.: US 7,182,071 B2
(45) Date of Patent: Feb. 27, 2007

(54) DEVICE FOR FUEL TRANSFER IN COMBUSTION ENGINES

(75) Inventor: Jonny Hansson, Södertälje (SE)

(73) Assignee: Scania CV AB (publ) (SE)

( * ) Notice: Subject to any disclaimer, the term of this patent is extended or adjusted under 35 U.S.C. 154(b) by 169 days.

(21) Appl. No.: 10/531,360

(22) PCT Filed: Sep. 25, 2003

(86) PCT No.: PCT/SE03/01488

§ 371 (c)(1),
(2), (4) Date: Apr. 14, 2005

(87) PCT Pub. No.: WO2004/038210

PCT Pub. Date: May 6, 2004

(65) Prior Publication Data

US 2006/0102155 A1    May 18, 2006

(30) Foreign Application Priority Data

Oct. 22, 2002  (SE) ................................. 0203138

(51) Int. Cl.
*F02M 37/00* (2006.01)
*F02M 37/06* (2006.01)
(52) U.S. Cl. ...................... 123/514; 137/571
(58) Field of Classification Search ............... 123/509, 123/510, 514; 137/571, 572, 565.01, 580
See application file for complete search history.

(56) References Cited

U.S. PATENT DOCUMENTS

| 4,306,580 A | 12/1981 | Wallquist et al. |
| 4,838,307 A | 6/1989 | Sasaki et al. |
| 5,168,891 A * | 12/1992 | Green et al. ................. 137/114 |
| 5,197,443 A * | 3/1993 | Hodgkins .................... 123/514 |
| 5,360,034 A * | 11/1994 | Der Manuelian ........... 137/571 |
| 6,382,225 B1* | 5/2002 | Tipton ........................... 137/1 |
| 6,494,226 B2* | 12/2002 | Tipton et al. .................. 137/1 |

(Continued)

FOREIGN PATENT DOCUMENTS

GB    1433875    4/1976

(Continued)

OTHER PUBLICATIONS

*U.S. Document No. 2004/0163631 is the English equivalent of SE 0101590.

*Primary Examiner*—Mahmoud Gimie
(74) *Attorney, Agent, or Firm*—Ostrolenk, Faber, Gerb & Soffen, LLP

(57) ABSTRACT

Fuel for an engine is supplied from a first fuel tank. Return fuel from the engine is gathered in a second fuel tank for resupply to the engine. The second fuel tank is connected to and replenishable from the first fuel tank. The engine receives all its fuel from the second tank. On the second fuel tank there is a level device for regulating the fuel level. The level device is supplied with fuel from the first fuel tank via a first line. The first line has an inlet which is intended for fuel and which is connected to the second fuel tank in order to be able to remove fuel from the latter. The inlet is arranged at a level corresponding to the intended fuel level in the second fuel tank.

10 Claims, 1 Drawing Sheet

U.S. PATENT DOCUMENTS

| | | |
|---|---|---|
| 6,502,558 B1 | 1/2003 | Brunel |
| 6,792,966 B2 * | 9/2004 | Harvey ................. 137/265 |
| 6,845,782 B2 * | 1/2005 | Osterkil et al. ............ 137/1 |
| 6,920,866 B2 * | 7/2005 | Leini et al. .............. 123/514 |
| 2001/0035215 A1 * | 11/2001 | Tipton et al. ............ 137/571 |
| 2001/0055530 A1 | 12/2001 | Eck |
| 2003/0056824 A1 * | 3/2003 | Harvey ................. 137/265 |
| 2004/0069344 A1 * | 4/2004 | Osterkil et al. ............ 137/255 |
| 2004/0163631 A1 | 8/2004 | Leini |
| 2006/0037587 A1 * | 2/2006 | Mc Clure et al. .......... 123/509 |

FOREIGN PATENT DOCUMENTS

| | | |
|---|---|---|
| SE | 0101590 | 11/2002 |

* cited by examiner

DEVICE FOR FUEL TRANSFER IN COMBUSTION ENGINES

CROSS REFERENCE TO RELATED APPLICATION

The present application is a 35 U.S.C. §§ 371 national phase conversion of PCT/SE2003/001488, filed 25 Sep. 2003, which claims priority of Swedish Application No. 0203138-3, filed Oct. 22, 2002. The PCT International Application was published in the English language.

TECHNICAL FIELD

The present invention relates to a device for fuel transfer for transfer from a return tank to a main tank in combustion engines.

STATE OF THE ART

In combustion engines of various kinds it is usual for fuel to be drawn from a fuel tank to the engine and for any excess fuel to be returned to the fuel tank. This entails the possibility of dirt, air, gas and heat also reaching the fuel tank, which may result in various kinds of problems. In particular, in cases where a diesel engine is provided with fuel injectors which are intended to be constantly open, there is a large return flow of fuel which is very hot and contains a great deal of air. The high return fuel temperature may make it necessary to use heat-tolerant material, e.g. steel, for the fuel tank instead of, for example, plastic. Another type of problem is that long fuel lines may make it difficult to meet essential positive and negative pressure requirements with respect to the fuel pump situated adjacent to the engine. Moreover, too much air in return fuel can cause excessive pressure in the fuel tank, and further possible problems may be caused by dirt accumulation in the fuel tank.

Returning excess fuel to the fuel tank may result in a flowmeter situated in the fuel line from the fuel tank not providing sufficiently accurate information about the engine's prevailing fuel consumption, since the return flow makes accurate measurement of fuel consumption difficult. An attempt to solve this problem is referred to in GB 1 433 875 whereby return fuel is gathered in an extra fuel tank which can be connected, when it reaches a sufficient fuel level, to the ordinary suction line between the fuel tank and the engine. This arrangement makes it possible for a flowmeter fitted close to the fuel tank to monitor fuel consumption with good accuracy, since return fuel does not reach the fuel tank. Even so, various problems may still arise, e.g. with regard to high pressure in fuel tanks or to long fuel lines and appropriate pressure at the fuel pump.

An improved device for fuel transfer was previously proposed in the applicant's own previous Swedish patent application No. 0101590-8, whereby an extra fuel tank is used for gathering and venting return fuel from the engine. In that case the extra fuel tank is fed with fuel from a main tank via an electric main pump which is controlled by a level sensor in the extra fuel tank. However, a disadvantage of that version is that the important monitoring of the fuel level in the extra fuel tank depends on the proper functioning of the level sensor and the electric main pump, which also need maintenance.

Against this background, there is a need for further improved solutions in this respect with a view to achieving, for example, greater operational reliability and simpler implementation and installation, particularly in cases where there is a large flow of return fuel from the engine.

OBJECTS OF THE INVENTION

The object of the invention is to make it possible to transfer fuel by means of a better and simpler device than previously. Another object is to prevent temperature increase and pressure increase in the fuel tank in order to be able to use simple material in its construction. A further object is to provide the possibility of flexibility regarding the location of various parts of the device.

SUMMARY OF THE INVENTION

These objects are achieved according to the invention. Fuel for an engine is supplied from a first fuel tank. Return fuel from the engine is gathered in a second fuel tank for resupply to the engine. The second fuel tank is connected to and replenishable from the first fuel tank. The engine receives all its fuel from the second tank. On the second fuel tank there is a level device for regulating the fuel level. The level device is supplied with fuel from the first fuel tank via a first line. The first line has an inlet which is intended for fuel and which is connected to the second fuel tank in order to be able to remove fuel from the latter. The inlet is arranged at a level corresponding to the intended fuel level in the second fuel tank.

Fuel from the ordinary fuel tank being only supplied to the engine via a special fuel tank in which return fuel from the engine is also gathered, and the fuel level being reliably monitored without the use of movable or electrically operated parts, results in great simplicity and, at the same time, good operational reliability. Good working conditions for the fuel pump which supplies the engine are thus created.

Further using a pump driven mechanically by the engine to supply the special fuel tank with fuel simplifies the control of that pump, while at the same time the pump can still be used in conjunction with an ejector in order to regulate the level in the special fuel tank and replenish it with fuel.

The special fuel tank may advantageously have a small volume relative to the ordinary fuel tank and be therefore easily kept well-filled, thereby reducing the risk of operational malfunction due to fuel splashing, e.g. on sharp bends. To eliminate the risk of fuel from the special fuel tank reaching the cylinders of the engine unintentionally, the special fuel tank should advantageously be situated at a lower level than the engine's cylinders.

The invention will now be explained in more detail on the basis of an embodiment described with reference to the attached drawing.

DESCRIPTION OF AN EMBODIMENT

Figure 1:
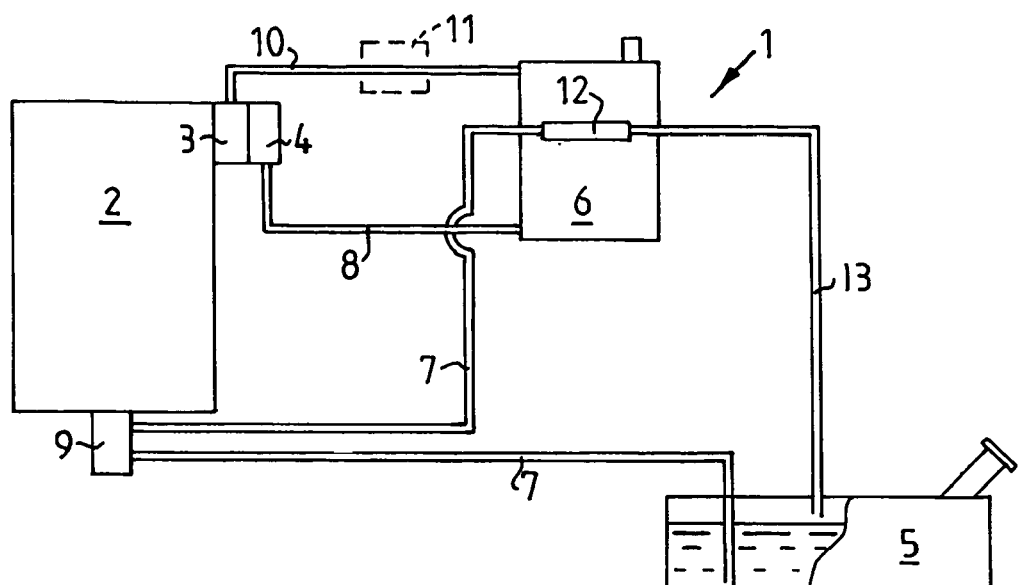
FIG. 1 depicts schematically an embodiment of a device according to the invention.

In a device 1 according to the invention and depicted in FIG. 1, a combustion engine 2, which may for example be situated in a vehicle, is provided with an injection device 3 which is fed by a fuel pump 4. A first fuel tank 5, situated a short distance from the engine 2, e.g. at an appropriate location in a vehicle, serves as fuel storage facility for the engine 2. Between this first fuel tank 5 and the engine 2 there is a second fuel tank 6 which is connected to the first fuel tank 5 by a first line 7 and to the fuel pump 4 by a second line 8. In the first line 7 there is a fuel pump 9 which is situated adjacent to the engine 2 and is driven via a power take-off on the latter. From the injection device 3, a return line 10, possibly provided with a fuel cooler 11, leads to the second fuel tank 6.

The second fuel tank 6 is connected via a level device 12 arranged on it both to the first line 7 and to a return line 13 which leads into the first fuel tank 5. Any excess fuel in the second fuel tank 6 can flow back as necessary to the first fuel tank 5 via the return line 13.

Figure 2:
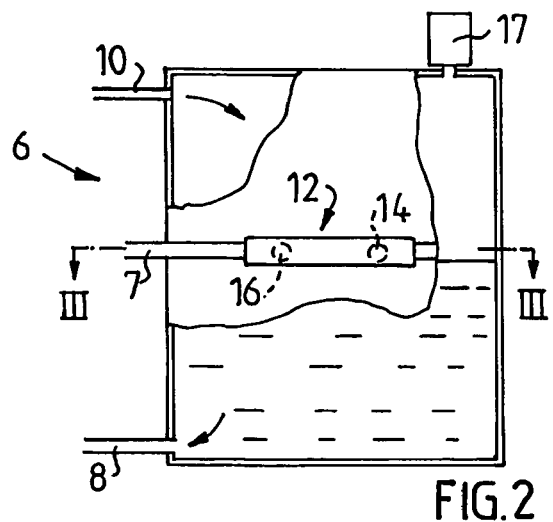
FIG. 2 depicts the second fuel tank in FIG. 1, partly in section.
Figure 3:
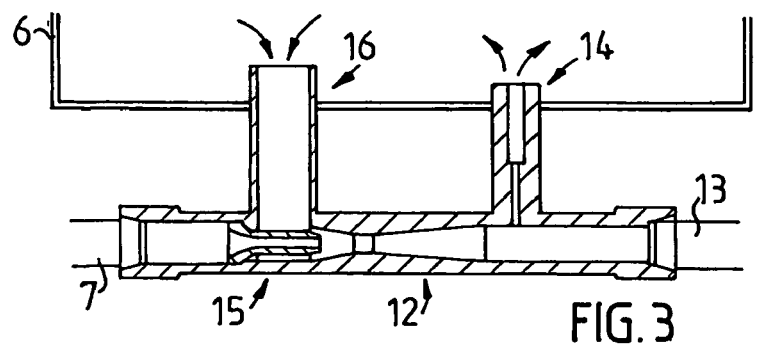
FIG. 3 depicts a section III—III in FIG. 2.

The more detailed configuration of the second fuel tank 6 is further indicated in FIGS. 2 and 3 in which arrows adjacent to the various lines indicate how fuel flows in and out. The purpose of the level device 12 is to monitor the fuel level in the second fuel tank 6, and this is why it is fitted on the latter at a level whereby a fuel quantity suitable for operation can be accommodated in the second fuel tank 6. The first fuel line 7 is connected to the level device 12 and leads, via an outlet 14 arranged on the level device 12, into the second fuel tank 6 in order to supply it with fuel from the first fuel tank 5. The amount of fuel which can be supplied via the outlet 14 should advantageously be somewhat greater than the engine's maximum fuel consumption. Excess fuel is fed back to the first fuel tank 5 via the return line 13. The level device 12 comprises an ejector 15 arranged upstream from the outlet 14 and driven by the fuel flow in the first line 7, which ejector 15 is in communication with the second fuel tank 6 via an inlet 16 and can therefore draw any fuel which is at the inlet 16. Suitable mutual configuration and dimensioning of the outlet 14 and the inlet 16 on the level device 12 makes it possible to ensure that the maximum fuel level in the second fuel tank 6 is determined by the height position at the inlet 16. This may be achieved by allowing a larger amount of fuel to be removed via the level device 12 than can be supplied via it. The outflow to the level device 12 via this inlet 16 may thus be larger than the inflow from its outlet 14. When there is a large return flow of fuel from the engine via the return line 10, the fuel level in the second fuel tank 6 can thus be prevented from rising higher than intended.

In the example here depicted, the outlet 14 and inlet 16 of the level device 12 are situated at substantially the same level in the second fuel tank 6, but other mutual positionings are also conceivable.

To make it easy for air in the return fuel coming in via the return line 10 to be removed, the mouth of the return line 10 is advantageously situated above the normal fuel surface, and the removal of this and other air is catered for by at least one vent valve 17 which is situated on the second fuel tank 6 and which normally connects the second fuel tank to the surrounding atmosphere but which in the event of, for example, an overturn closes the fuel tank and prevents the fuel from escaping. Such vent valves are well-known and therefore need no further description here.

The fact that the fuel in the second fuel tank 6 can be kept well-vented and at a reasonably constant level results in reliable fuel supply to the engine 2 via the second line 8, the inlet to which is situated low down. The second fuel tank 6 also with advantage having a significantly smaller volume than the first fuel tank 5, advantageously not more than about one-tenth of the latter's volume, means that fuel splashing is minimized and that the inlet to the second line 8 always receives fuel even when the fuel level in the first fuel tank 5 is low and during vigorous maneuvering of a vehicle.

The two fuel pumps 4 and 9 are driven mechanically by the engine 2, resulting in good operational reliability. The first fuel tank 5 may possibly be divided into two or more fuel tanks which may be situated appropriately on a vehicle, e.g. so as to make good use of available space, and such fuel tanks may also advantageously be connected to one another to enable them to be served by a common fuel pump.

The material of the second fuel tank 6 may advantageously be, for example, steel to tolerate high fuel temperatures, whereas the material of the first fuel tank 5, which is subject to only limited temperatures, may advantageously be, for example, plastic.

The drawing depicts the various lines as single lines, but it is of course possible, where so desired, to replace single lines by, for example, dual lines. In certain configurations this may in particular be advantageous as regards the second line 8 and the return line 10.

It is also advantageous that the first fuel tank 5, like the second fuel tank 6, be provided with a vent valve (not depicted). It is also advantageous for it to be provided with a sensor (not depicted) connected to a fuel volume meter.

In long vehicles, e.g. buses, there is usually great distance between engine and fuel tank. This has previously made it necessary, when a fuel stoppage occurs, to use a hand pump to bring fresh fuel to the engine before attempting to start up again. Such problems may be obviated by a solution according to the invention whereby fuel stoppage can be indicated when the first fuel tank 5 is empty, while there is still fuel remaining in the second tank 6 to cater for an attempt to start up again.

The use according to the invention of a specially configured level device 12 for controlling the fuel level in the second fuel tank 6 obviates any electrical or mechanically movably equipment for controlling the fuel level to the engine 2, thereby making it possible to improve the reliability of the fuel system.

The invention claimed is:

1. A device for fuel transfer between an engine, a first fuel tank, and a second fuel tank the device comprising:
   the first fuel tank and the second fuel tank;
   a first return line connected to gather return fuel from the engine and connected to return fuel to the second fuel tank,
   a first fuel pump connected between the second fuel tank and a fuel inlet to the engine for conveying fuel to the engine, the second fuel tank is connected to and replenishable from the first fuel tank;
   a level device on the second fuel tank operable for regulating the fuel level in the second fuel tank;
   a first line supplies fuel from the first fuel tank to the level device and a second return line connected to return fuel to the first fuel tank from the level device;
   a second fuel inlet to the level device connected to the second fuel tank, the second fuel inlet is operable to remove fuel from the second fuel tank, the second fuel inlet being arranged at a level corresponding to an intended fuel level in the second fuel tank.

2. A device according to claim 1, wherein the level device comprises an ejector connected to the second fuel inlet, and the ejector is driven by fed fuel in the first line, the ejector being operable to draw excess fuel from the second fuel tank via the fuel inlet.

3. A device according to claim 2, further comprising an outlet from the level device to the second fuel tank operable to supply fuel to the second fuel tank, the outlet being operable to supply the second fuel tank with an amount of fuel at least corresponding to a maximum fuel consumption of the engine.

4. A device according to claim 3, wherein in a fuel transfer direction from the first line to the second return line, the outlet is arranged downstream from the inlet.

5. A device according to claim 1, wherein the level device is operable to remove from the second fuel tank via the second fuel inlet an amount of fuel large enough to keep the fuel level in the second fuel tank at the level of the second fuel inlet.

6. A device according to claim 1, further comprising a second fuel pump in the first line, the second pump being driven by the engine.

7. A device according to claim 1, wherein the second fuel tank has a smaller volume than the first fuel tank.

8. A device according to claim 1, further comprising an outlet towards the first fuel pump and the engine from the second fuel tank and the outlet being situated low down in the second fuel tank.

9. A device according to claim 1, further comprising an outlet from the level device to the second fuel tank operable to supply fuel to the second fuel tank, the outlet being operable to supply the second fuel tank with an amount of fuel at least corresponding to a maximum fuel consumption of the engine.

10. A device according to claim 7, wherein the volume of the second fuel tank is not more than about one-tenth of the volume of the first fuel tank.

* * * * *